United States Patent [19]
Pomikacsek

[11] Patent Number: 4,824,300
[45] Date of Patent: Apr. 25, 1989

[54] EDGE MILLER FOR MACHINING THE EDGES OF SHEET METAL

[75] Inventor: Josef Pomikacsek, Amunden, Austria

[73] Assignee: Linsinger Maschinenbau GmbH, Austria

[21] Appl. No.: 16,220

[22] Filed: Feb. 19, 1987

[30] Foreign Application Priority Data

Feb. 24, 1986 [DE] Fed. Rep. of Germany ....... 3605861

[51] Int. Cl.⁴ .............................................. B23C 3/12
[52] U.S. Cl. ...................................... 409/138; 83/869; 407/7
[58] Field of Search ............... 409/137, 138, 139, 140; 407/7, 56, 58, 59; 83/869

[56] References Cited

U.S. PATENT DOCUMENTS

| | | | |
|---|---|---|---|
| 2,885,766 | 5/1959 | Ernst et al. | 407/7 |
| 3,289,717 | 12/1966 | Dutot | 407/56 |
| 3,329,065 | 7/1967 | Vaughn | 407/7 |
| 3,486,542 | 12/1969 | Blackwell, Jr. | 407/7 |
| 3,515,029 | 6/1970 | Gambini | 409/232 |

FOREIGN PATENT DOCUMENTS

| | | | |
|---|---|---|---|
| 2758014 | 7/1979 | Fed. Rep. of Germany | 409/140 |
| 206969 | 4/1971 | U.S.S.R. | 407/7 |

*Primary Examiner*—Gil Weidenfeld
*Assistant Examiner*—Daniel W. Howell
*Attorney, Agent, or Firm*—Robin, Blecker & Daley

[57] ABSTRACT

An edge miller for machining the edges of sheets advanced in motion relative thereto includes a milling unit supported for rotation therein and in turn supporting circular cutters for rotation relative thereto. The milling unit has bearings for each of the circular cutters supporting such rotation thereof, the bearings disposing the longitudinal cutter axes such that the axial and radial positions thereof are alternatively above and below the thickness centerline of the sheet and that each circular cutter has a cutting edge range between first and second cutting edge points. Machining forces between such cutting edge and the workpiece during engagement produce a torque for rotating said circular cutter.

2 Claims, 2 Drawing Sheets

4,824,300

EDGE MILLER FOR MACHINING THE EDGES OF SHEET METAL

FIELD OF THE INVENTION

This invention concerns an edge miller for machining the edges of sheets that are fed forward or along the edges of sheets in motion relative to a milling unit, with the edge miller provided with circular cutters in motor-driven rotation and the longitudinal cutter axes of the circular cutters being placed radially relative to the milling head so that they lie alternately above and below the thickness centerline of the sheet at uniform radial and diagonal distances.

BACKGROUND OF THE INVENTION

The machining of the edges of sheets with edge millers is a generally well-known process. In such cases the loaded cutter length is constant as a function of the strip thickness and the advance position of the cutters. In machining with high power, this results in a concentrated cutting load, that has the effect of reducing the working life. One possibility for improving this situation consists of lengthening the active cutting length.

Milling units with cylindrical cutter units that are mounted on their longitudinal axes are disclosed by European Patent No. 0 038 923 and elsewhere. The rotating cutting tool described in this publication is a face miller for sheet metal edges in which the machined surface is perpendicular to the axis of rotation of the milling unit. The axes of rotation of the cutters of this known face miller are arranged parallel to the working surface. Consequently, the fronts of the cylindrical cutters are used for the chip-removing tool surfaces. However, this known face miller cannot be used under conditions of practical application, and one of the main reasons for this is the excessively low achievable rate of milling, that results from small contact lengths corresponding to the geometric conditions. Thus, the machining conditions prevailing with this known cutting tool and thus the chipping efficiency are unfavorable.

An edge miller of the type mentioned initially is disclosed essentially in German patent application Disclosure No. 2 735 283. In this case there is a solid, nonrotating screw connection between the milling unit and the circular cutters, so that it is impossible for the cutters to rotate during the contact. For this reason, because of the concentrated load on the cutter edges, only very short lifetimes are possible in high-output applications. Another substantial drawback of this known edge miller is the fact that the machining of the V-shaped diagonal cut running on the centerline of the plate has to be done either with two sloping millers or with a two-part miller consisting of upper and lower cutters. In both cases the chipping conditions in the area of the centerline of the plate are extremely unfavorable, since in this case the value of the rake angle is equal to zero in each case with the contact points of the cutting wheels in the area of the cutting lines. Consequently, this known edge miller is practically unusable for machining metallic workpiece.

SUMMARY OF THE INVENTION

Therefore, the basic purpose of this invention is to describe an edge miller for machining the edges of sheet metal that meets the requirements for high-performance machining processes with very good durability.

Proceeding from an edge miller of the type defined at the outset, this problem is solved pursuant to the invention by providing that the circular cutters are placed to rotate on the milling unit by means of bearings, and the axial and radial positions of the axes of cutter rotation above and below the thickness centerline of the sheet, respectively, are determined by these bearings in such a way that each circular cutter has a cutting edge region effective for the milling process between two cutting edge points P1 and P2. When a circular cutter is in engagement with the workpiece, P1 is the point obtained by projecting the axis rotation of the cutter perpendicular to the direction of rotation of the milling unit until it intersects the circumference of the cutter. When a circular cutter is in engagement with the workpiece, P2 is the point obtained by projecting the axis of rotation of the cutter parallel to the direction of rotation of the milling unit until it intersects the circumference of the cutter. P1 and P2 thus comprise points bounding the effective cutting range of the circular cutter. Machining forces during engagement produce a torque acting on the shell of the circular cutter for rotating the cutter.

Because of the design of the edge miller pursuant to the invention, a more favorable oblique cut is provided in connection with the load on the cutting edge, and complete utilization of the cutter length corresponding to the circumference of the cutting edge is provided for. Because of the circular cutters rotating around their own axes as a result of the machining forces, the cutting power acting on a tooth during the machining is distributed corresponding to the length of the cutting edge circumference, because of which substantially lower specific cutting edge loads are reached than with a conventional edge miller.

However, it is also particularly beneficial that the effective cutting edge area of a circular cutter is given in each case by the range between the two cutter edge points P1 and P2 in such a way that these cutter edge points are not reached, so that on the one hand the cutter edge point P1 with a rake angle approaching zero is avoided, but on the other hand the cutter edge point P2 at which the machining forces produce no torque is also excluded.

The relative motion between the miller and the sheet metal can be brought about in a known way, by advancing either the sheet or the miller. The design pursuant to the invention has special significance in the machining of sheet metal strips, since in practice higher milling outputs are used in this field than in machining with advancing miller.

For this reason, the characteristics of the edge miller pursuant to the invention are illustrated with the example of the machining of advancing sheet metal strips.

The circular cutters of the milling unit can preferably be designed with cylindrical or similar shape, with concave or conical envelope contour line. The cutters can suitably be designed so that both limiting edges of the rotary cutter being used can be used as cutting edges. Carbide cutters are used in particular.

In accordance with a beneficial refinement of the invention, it is desirable to choose the slope of the axis of rotation of the cutter relative to a desired machining plane with a rake angle in such a way that the desired machining plane in the area of the top and bottom edge angles conforms to an elliptical cut arc of a circular cutter.

The circular cutters with their circular cutting edges, corresponding to the attitude of their radial longitudinal axial positions parallel to the milling unit, produce a machining contour that can be described as elliptical arcs. This produces a possible correction of the cut face surface in comparison with the top and bottom planes of the sheet.

In order to be able to utilize the machining forces as a torque acting on the cutters, it is necessary for the resultant cutting forces to be effective above or below the particular axis of rotation of the cutters. This results in the mentioned elliptical arcs lying mostly or completely between the two elliptical axes, which produces arched surfaces differing slightly from the desired position if the horizontal cutter axial position is on the desired cutting plane. The smallest deviation from the position of the desired machining plane can be reached when the curved surface determined by the elliptical arcs conforms to the desired plane of machining in the area of the two edge angles of the sheet. In order to be able to adhere to this condition, it is necessary for the axes of rotation of the circular cutters, observed in the machining position, to be appropriately slanted from the direction of the desired plane of machining.

Further details and benefits of the invention will be described in detail with reference to the drawings.

DESCRIPTION OF PREFERRED EMBODIMENTS AND PRACTICES

Figure 1:
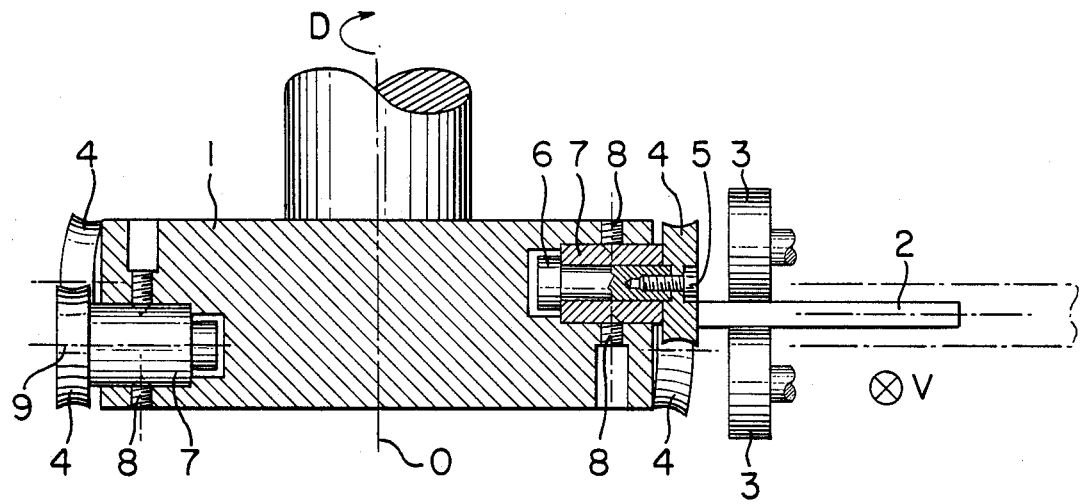
FIG. 1 is schematic illustration of an edge miller pursuant to the invention for machining the edges of sheet metal.

FIG. 1 shows an edge miller corresponding to an example of embodiment of the invention, in sectional side elevation, with a cylindrical milling unit 1 being set in rotation around its longitudinal axis O in a direction of rotation D, and machining the edge of an advancing sheet 2 in the direction V. The machining position of the sheet edge is determined by guide rolls 3 acting with pressure on the two faces of the sheet.

Figure 2:
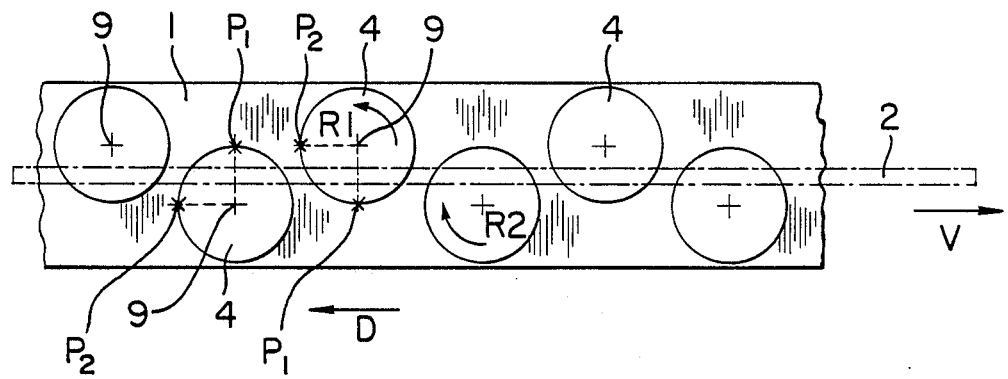
FIG. 2 is schematic illustration of the shell of a milling unit with the cutting system pursuant to the invention in partial portrayal.

Rotating circular cutters 4 are mounted with bearings 7 at uniform distances from one another in uniform radial positions on the milling unit 1. Each of the circular cutters 4 is connected solidly with screws 5 to the shafts 6 placed approximately radially to the milling unit 1 on the same longitudinal axis. It is beneficial for the axes of rotation of the shafts 6 to be arranged alternately at uniform distances above and below the sheet thickness centerline. The bearings 7 are connected to the milling unit 1 by fasteners 8. The positions of the shafts 6 and the circular cutters 4 connected to them above or below the thickness centerline of the sheet 2 are determined by the bearings 7 in both the axial and radial directions in such a way that each of the circular cutters 4 has a cutting edge range effective for the milling process between two cutting edge points P1 and P2, as described below in detail with reference to FIG. 2, in which the shell of an edge miller pursuant to the invention is ilustrated in development schematically in a partial illustration.

The position of the sheet 2 is indicated in broken lines. The directions of rotation R1 and R2 of the circular cutters 4 cutting in succession, whose axes of rotation 9 are alternately above and below the sheet thickness centerline at uniform distances, are opposite. Consequently, the reaction force components occurring on the sheet faces have compensating effects on one another with the circular cutters 4 cutting in succession.

When circular cutter 4 is in engagement with the workpiece, P1 is the point obtained by projecting the axis rotation of the cutter perpendicular to direction D until it intersects the circumference of the cutter. When circular cutter 4 is in engagement with the workpiece, P2 is the point obtained by projecting the axis of rotation of the cutter parallel to direction D until it intersects the circumference of the cutter. P1 and P2 thus comprise points bounding the effective cutting range of the circular cutter. Machining forces during engagement produce a torque acting on the shell of the circular cutter for rotating the cutter.

Since on the one hand the rake angle approaches zero at the cutting edge point P1 and the machining forces can produce no torque on the other hand at the cutting edge point P2, the cutting range must always lie inside of these two cutting edge points P1 and P2. These conditions can be met very satisfactorily if the cutting range is designed approximately in the center between the two cutting edge points P1 and P2, and it is also very beneficial for the sheet thickness used to be less than half of the radius of the cutting edge.

Because of these features, the machining forces occurring during the cutting can each exert a torque on the circular cutters 4 and set them in rotation in this way. This produces two important effects, namely an oblique cut with low chipping resistance and a low cutting edge load by utilizing the cutting edge length corresponding to the circumference. In the last analysis, the two effects increase the lifetime and the load capacity of the milling unit.

Another advantage of the cutter system illustrated is that a substantially higher number of teeth can be reached than in a milling head design without diagonal cutter offset.

Figure 3:
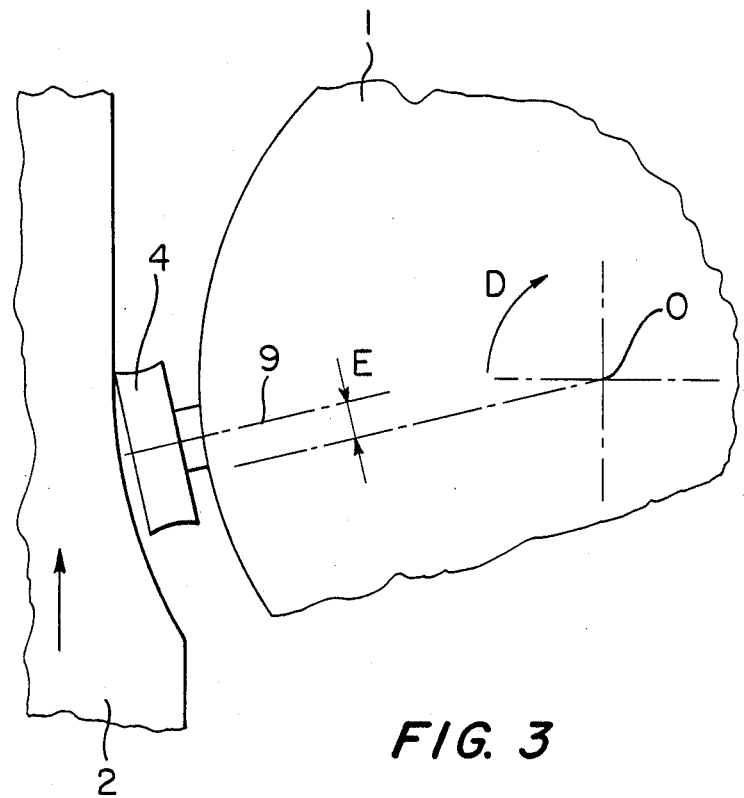
FIG. 3 is schematic illustration of the position of the central axis of the rotating cutter in the cutting position offset relative to the plane of rotation.

FIG. 3 shows the position of an offset axis of rotation of a cutter 9 projected relative to the plane of rotation of the milling unit, in schematic representation.

A sheet 2, a milling unit 1, and a circular cutter 4 mounted on it whose axis of rotation 9 is shifted by a shown offset E in the direction of rotation D of the milling unit 1 parallel to its radial direction, are shown schematically in plan view. This makes the excursion circle of the face of the circular cutting edge placed in the direction of rotation greater than that of the other face in the plane of the sheet. With the cutter axial position placed radially to the milling unit 1, the face of the cutting edge against the direction of rotation D would slide on the cut surface, which would cause unnecessary wear.

Figures 4, 5:
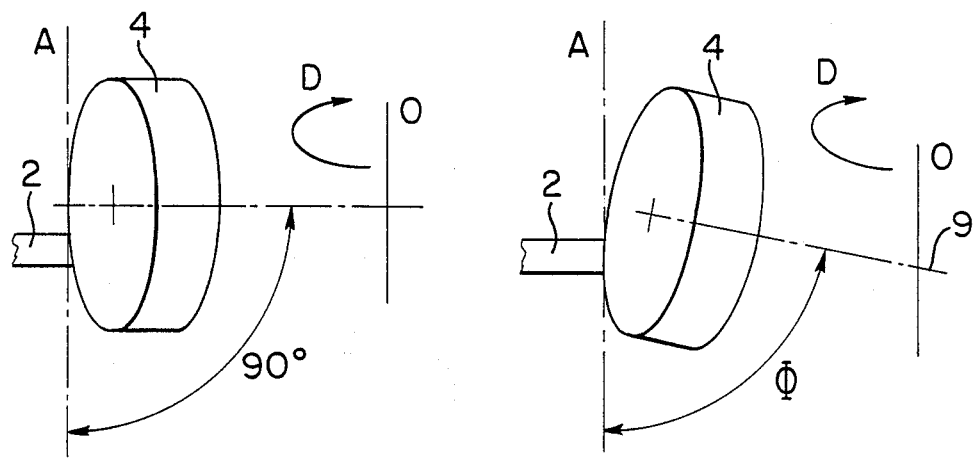
FIG. 4 shows the cut contour of a machined surface with cutter axes parallel to the plane of rotation of the milling unit, in schematic illustration.
FIG. 5 shows an approach of the position to the desired cutting plane by inclination of the elliptical cut contour shown in FIG. 4.

FIG. 4 shows the cut edge contour of a circular cutter 4 of the milling unit 1 driven in the direction of rotation D rotating around its own axis of rotation O, in schematic illustration, with the axial line of the circular cutter 4 being positioned parallel to the plane of rotation of the milling unit 1. The position for achieving the desired cut surface is indicated by the intended machining surface A. The actual machining contour lies on an elliptical arc diagonal to the intended surface.

FIG. 5 shows the edge miller illustrated schematically in FIG. 4 with inclined axis of cutter rotation 9, whose angle of inclination phi relative to the intended machining plane A is chosen so that in the area of the two (top and bottom) edges of the sheet the curved surface determined by the elliptical arc conforms to the desired machining plane A. With such an arrangement very good accuracy of the position of the surface to be machined can be produced.

I claim:

1. An edge miller for machining the edges of sheets advanced in motion relative thereto, said edge miller including a milling unit supported for rotation therein and in turn supporting circular cutters for rotation relative thereto, said milling unit having bearings for each of said circular cutters supporting such rotation thereof, said circular cutters having axes of rotation, which are disposed alternatingly above and below the thickness centerline of the sheet and determined by the bearings in both the axial and radial directions in such a way that each circular cutter has a cutting edge range between first and second cutting edge points, said first cutting edge point, when said circular cutter is in engagement with the workpiece, being a point obtained by projecting the axis of rotation of the cutter perpendicular to the direction of rotation of the milling unit until it intersects the circumference of the cutter, said second cutting edge point, when said second circular cutter is in engagement with the workpiece, being a point obtained by projecting the axis of rotation of the cutter parrallel to the direction of rotation of the milling unit until it intersects the circumference of the cutter, said first and second cutting edge points bounding said cutting edge range and machining forces between such cutting edge and said workpiece during such engagement thereof producing a torque for rotating said circular cutter.

2. The edge miller claimed in claim 1, characterized by the fact that the inclination of the axis of rotation of each cutter relative to an intended plane of machining is chosen at an angle of inclination such that the intended machining plane in the area of the top and bottom edges of the sheet conforms to an elliptical cutting arc.

* * * * *